(12) United States Patent
DeGroot et al.

(10) Patent No.: US 9,751,695 B2
(45) Date of Patent: Sep. 5, 2017

(54) INFEED AND OUTFEED ASSEMBLIES FOR A CONVEYOR

(71) Applicant: Laitram, L.L.C., Harahan, LA (US)

(72) Inventors: Michael Hendrik DeGroot, Rockford, MI (US); Gerko Hulshof, Aalten (NL); Philipp J. Hortig, Rockford, MI (US); Matthew A. Steenwyk, Grandville, MI (US); Jeff Batchelder, Grand Haven, MI (US)

(73) Assignee: Laitram, L.L.C., Harahan, LA (US)

(*) Notice: Subject to any disclaimer, the term of this patent is extended or adjusted under 35 U.S.C. 154(b) by 0 days.

(21) Appl. No.: 15/134,678

(22) Filed: Apr. 21, 2016

(65) Prior Publication Data

US 2016/0311622 A1 Oct. 27, 2016

Related U.S. Application Data

(60) Provisional application No. 62/151,617, filed on Apr. 23, 2015.

(51) Int. Cl.
*B65G 21/06* (2006.01)
*B65G 21/10* (2006.01)
*B65G 23/44* (2006.01)
*B65G 39/16* (2006.01)
*B65G 47/66* (2006.01)

(52) U.S. Cl.
CPC ............ *B65G 21/06* (2013.01); *B65G 21/105* (2013.01); *B65G 23/44* (2013.01); *B65G 39/16* (2013.01); *B65G 47/66* (2013.01)

(58) Field of Classification Search
CPC ...... B65G 21/06; B65G 21/105; B65G 15/60; B65G 23/44
See application file for complete search history.

(56) References Cited

U.S. PATENT DOCUMENTS

| 4,934,513 A | * | 6/1990 | Kirkpatrick | ............ B65G 47/66 198/612 |
| 5,915,527 A | * | 6/1999 | Nakamura | ............. B65G 15/62 198/823 |

(Continued)

FOREIGN PATENT DOCUMENTS

| EP | 1418139 A1 | 5/2004 |
| WO | 2010033764 A1 | 3/2010 |

OTHER PUBLICATIONS

International Search Report and Written Opinion of the International Searching Authority, PCT/US2016/028571, dated Jul. 27, 2016, Korean Intellectual Property Office, Daejeon, Republic of Korea.

*Primary Examiner* — Thomas Randazzo
(74) *Attorney, Agent, or Firm* — Catherine M. Bishop

(57) ABSTRACT

A conveyor employs an infeed assembly and outfeed assembly, each comprising a nosebar assembly that may be mounted to a conveyor frame to transition a conveyor belt between a returnway and a carryway. The outfeed assembly further includes a drive sprocket and a limiter to ensure engagement of drive elements on the conveyor belt with the drive sprockets. A limiter plate ensures proper placement of the limiter relative to the drive sprocket. The infeed assembly and outfeed assembly components may be easily mounted to and removed from the conveyor frame to facilitate replacement, cleaning or maintenance.

20 Claims, 18 Drawing Sheets

(56) References Cited

U.S. PATENT DOCUMENTS

| | | | | |
|---|---|---|---|---|
| 5,934,449 | A * | 8/1999 | Dolan | B65G 17/08 |
| | | | | 198/806 |
| 9,242,801 | B2 * | 1/2016 | DeGroot | B65G 23/26 |
| 2005/0145465 | A1 | 7/2005 | Ertel et al. | |
| 2007/0017786 | A1 * | 1/2007 | Hosch | B65G 15/62 |
| | | | | 198/841 |
| 2011/0173791 | A1 * | 7/2011 | Whittlesey | A22C 11/02 |
| | | | | 29/402.08 |
| 2014/0311874 | A1 * | 10/2014 | Franzaroli | B65G 21/06 |
| | | | | 198/804 |
| 2015/0001137 | A1 * | 1/2015 | Layne | B07C 5/36 |
| | | | | 209/552 |

\* cited by examiner

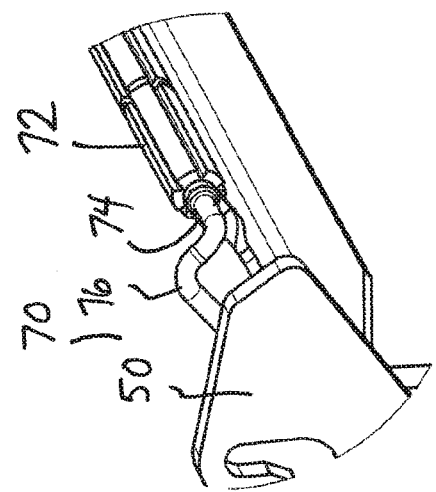
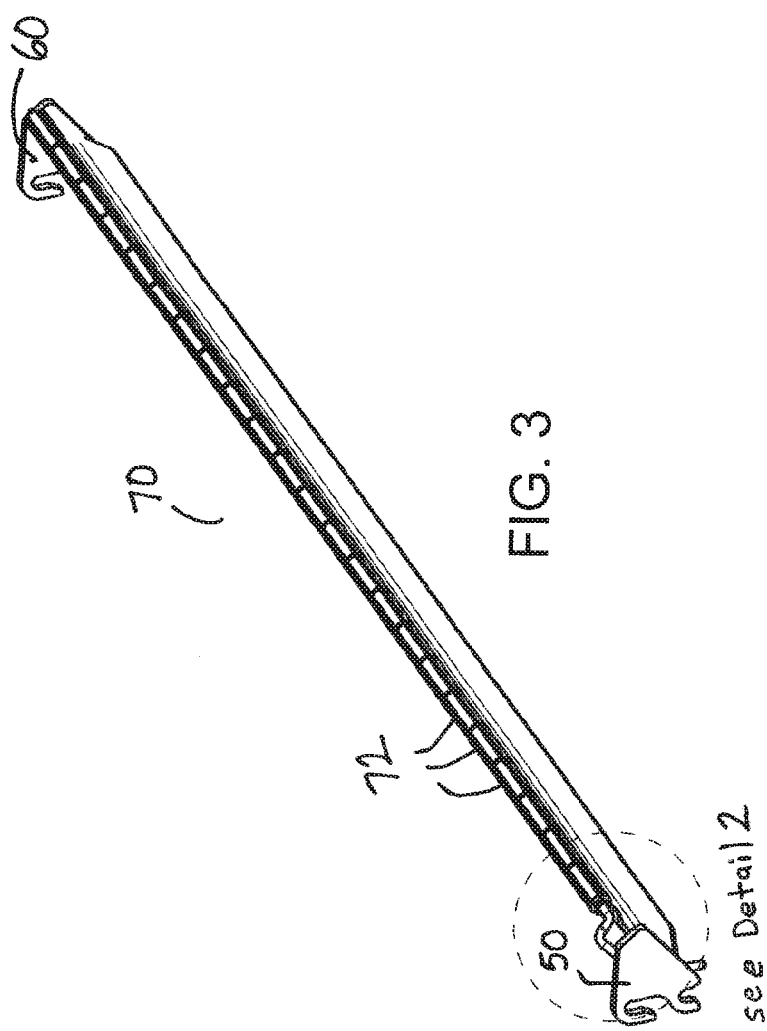

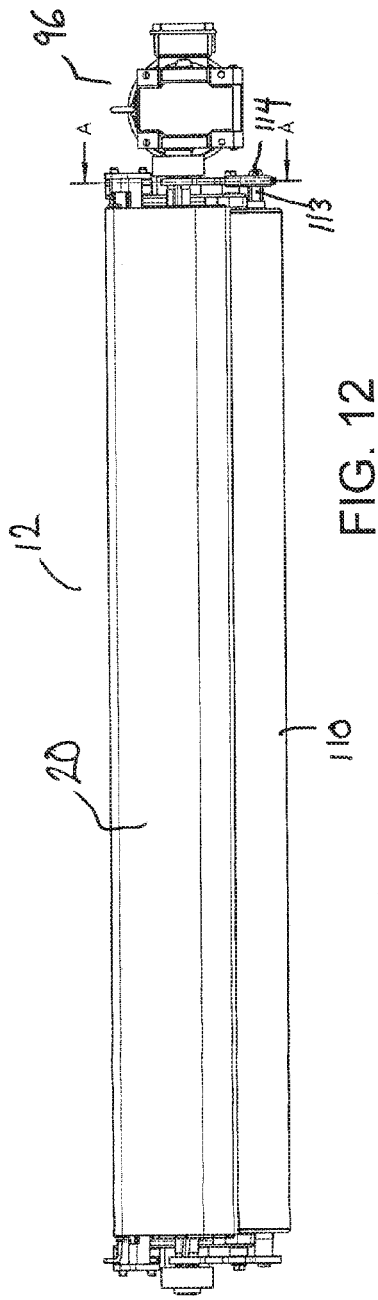
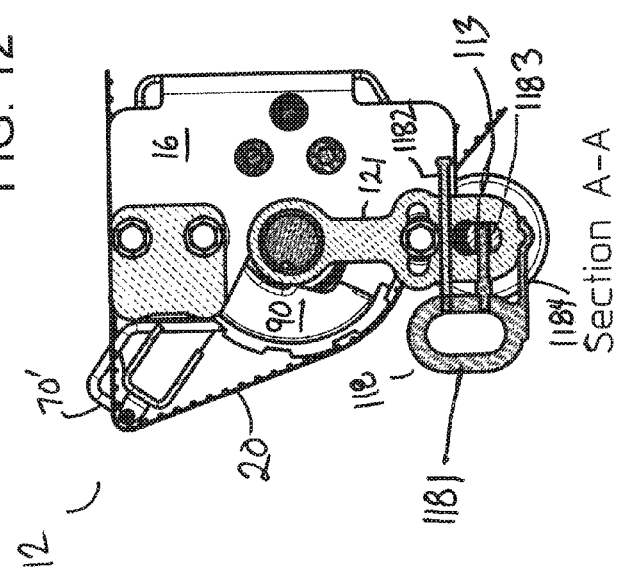
FIG. 12
FIG. 13

Section B-B

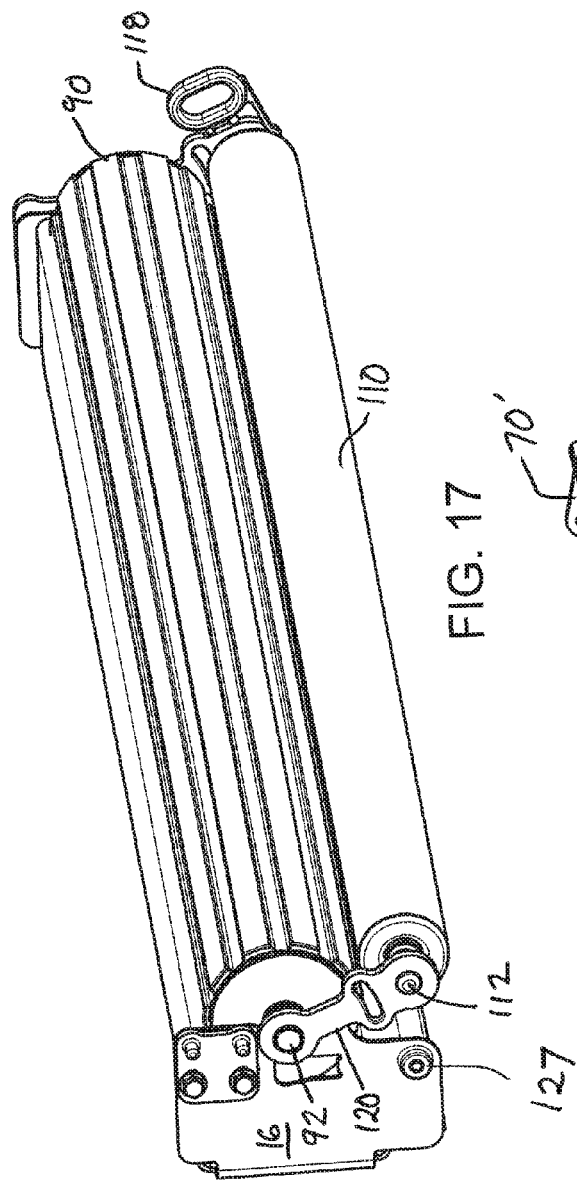
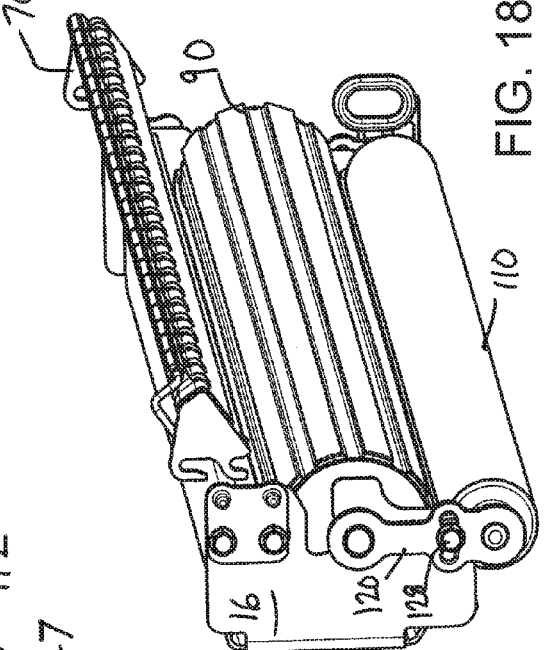

DETAIL2

INFEED AND OUTFEED ASSEMBLIES FOR A CONVEYOR

RELATED APPLICATIONS

The present application claims priority to U.S. Provisional Patent Application No. 62/151,617, filed Apr. 23, 2015 and entitled "Infeed and Outfeed Assemblies for a Conveyor", the contents of which are herein incorporated by reference.

FIELD OF THE INVENTION

The present invention relates to power-driven conveyors. More particularly, the invention relates to infeed and outfeed assemblies for a conveyor to transition conveyed items onto and off of the conveyor.

BACKGROUND OF THE INVENTION

Power-driven conveyors are used to convey items. Infeed assemblies are used to transition items onto the conveyor as the conveyor belt moves from a returnway to a carryway above the returnway. Outfeed assemblies are used to transition items off of the conveyor as the belt moves from the carryway to the returnway. A drive moves the conveyor belt through the conveying circuit. For example, drive sprockets mounted on a rotatable shaft may engage and drive the conveyor belt along the conveying circuit.

Currently, it is difficult to either clean or maintain cleanliness in conveyors and-or to disassemble certain components for cleaning, replacement or maintenance.

In addition, small transfers of items are generally limited to flat belts that operate using pretension. The pretension, combined with the velocity of the infeed and-or outfeed rollers, results in a short life span for the rollers or static nose bars that guide the belts. Replacement of worn components leads to downtime of the conveyor and can be difficult.

SUMMARY OF THE INVENTION

A conveyor comprises a frame, a positive-drive, low tension conveyor belt trained around an infeed portion and an outfeed portion. An infeed assembly is mounted to the frame and includes a removable belt-guiding assembly comprising an axle extending between mounting plates and a rotatable nosebar mounted to the axle. The mounting plates are removable mounted to the frame to integrate the belt-guiding assembly into the conveyor. An outfeed assembly may also include a removable belt-guiding assembly, and also employs a roller limiter for ensuring proper engagement of the conveyor belt with a drive sprocket or tension amplifier and limiter plate for ensuring proper placement of the roller limiter relative to the drive sprocket or tension amplifier.

According to one aspect, a conveyor comprises a frame including opposing side plates at an end of the conveyor and a removable belt-guiding assembly mounted to the opposing side plates. Each side plate includes at least one outward-facing protrusion. The belt-guiding assembly comprises a support beam extending from a first side to a second side, arms extending from the support beam, an axle supported by the arms, the axle having a curved end, and a rotatable nosebar mounted on the axle. The removable belt-guiding assembly is mounted to the frame using the outward-facing protrusion.

According to another aspect, a belt-guiding assembly for guiding a conveyor belt around an end of a conveyor frame comprises a support beam extending from a first side to a second side, a plurality of arms extending from the support beam, each arm including an opening, an axle passing through the openings, the axle having a curved end and a plurality of rotatable nosebar segments inserted in spaces between the arms and mounted on the axle.

According to another aspect, a conveyor comprises a frame, a positive-drive, low tension conveyor belt trained around an infeed portion and an outfeed portion. The out feed portion comprises a belt guiding assembly comprising a rotatable nosebar for guiding the conveyor belt from a carryway to a returnway a drive sprocket mounted on a drive shaft below the belt guiding assembly and a roller limiter mounted a fixed distance away from the drive sprocket to ensure engagement of the conveyor belt with the drive sprocket.

BRIEF DESCRIPTION OF THE FIGURES

FIG. 3 shows a nosebar assembly of the infeed end of FIG. 1;

FIG. 4 is a detailed view of a portion of the nosebar assembly of FIG. 3;

FIG. 12 is a front view of the outfeed end of FIG. 7, with a handle in a first position;

FIG. 13 is a cross-sectional view through line A-A of FIG. 12;

FIG. 17 is an isometric view of the outfeed end of FIG. 7 during pivoting of the roller limiter around the drive shaft;

FIG. 18 is an isometric view of the outfeed end during removal of a nosebar assembly;

DETAILED DESCRIPTION OF THE INVENTION

The present invention provides a sanitary system at the infeed and-or outfeed end of a conveyor that can be easily installed and removed without tools. The system facilitates transfer of products to and from positively-driven, low tension endless conveyor belts and enables small diameter transfers. The present invention will be described below relative to an illustrative embodiment. Those skilled in the art will appreciate that the present invention may be implemented in a number of different applications and embodiments and is not specifically limited in its application to the particular embodiments depicted herein.

Figure 1:
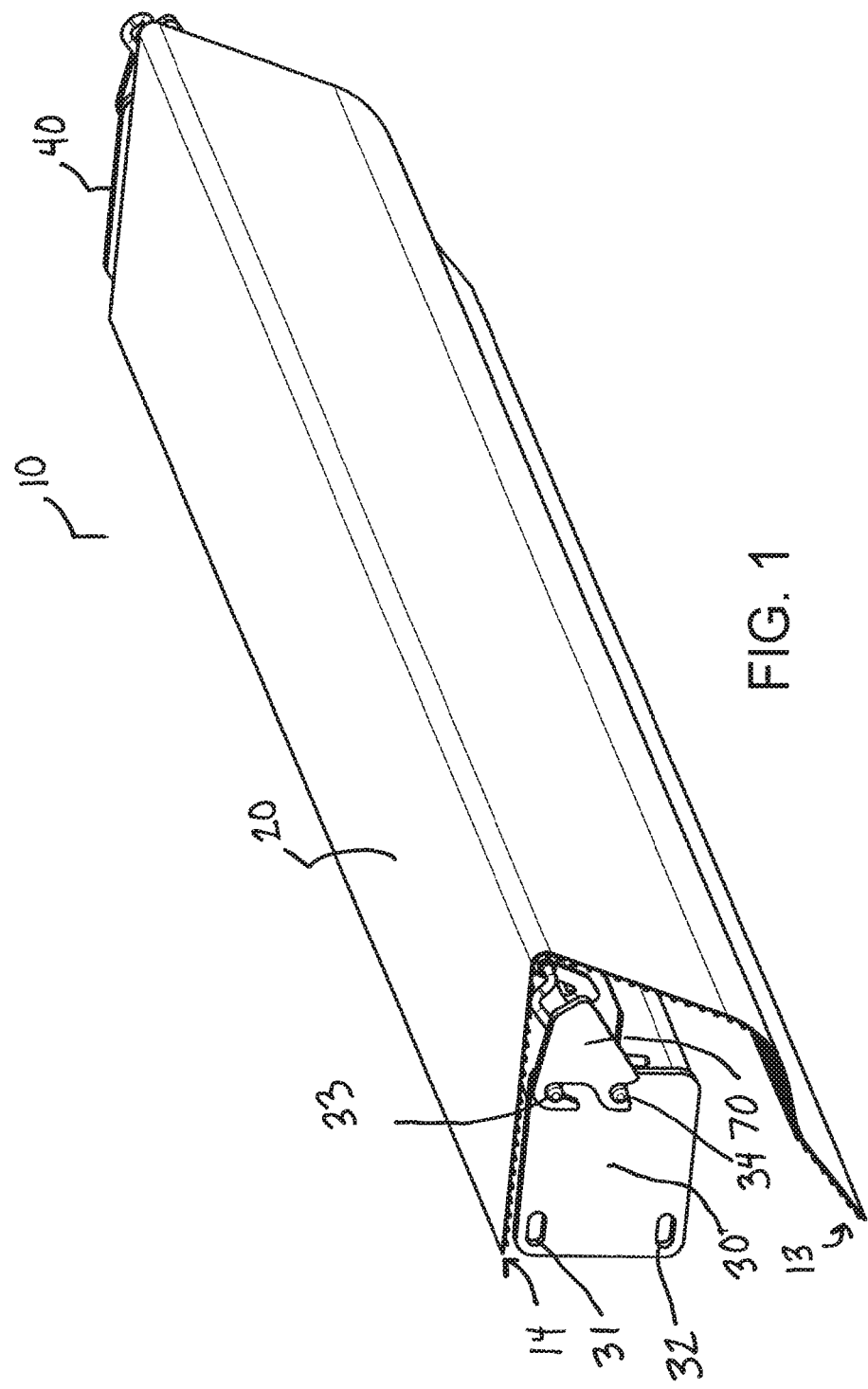
FIG. 1 is an isometric view of an infeed end of a conveyor according to an embodiment of the invention.

FIG. 1 shows an infeed portion 10 of a conveyor belt system according to an embodiment of the invention. The conveyor belt system includes a frame and a positively-driven, low tension conveyor belt 20, such as the Thermo-Drive® belt available from Intralox, L.L.C., the Cleandrive positive drive belt available from Habasit AG, the Gates Mectrol PosiClean® positive drive belt available from Gates Mectrol, the Volta SuperDrive™ and other positive drive belts available from Volta Belting and other positively-driven, low tension conveyor belts known in the art. The invention is not limited to these belts, and may be implemented with any suitable positive-drive, low tension conveyor belt. The illustrative conveyor belt has a smooth outer surface substantially free of discontinuities and an inner surface with a plurality of teeth at a given belt pitch or other suitable drive elements. The conveyor belt 20 conveys products along a carryway and returns along a returnway below the carryway. The conveyor belt may be conventionally trained around belt-guiding members in the infeed portion 10 and outfeed portion 12 (shown in FIGS. 3-4), as described below.

At the infeed end 10, the conveyor belt 20 comes up from the returnway 13 and enters the carryway 14, and items to be conveyed transition onto the conveyor belt 10. First and second frame plates 30, 40 are located on either side of the conveyor belt 20 to connect the infeed assembly 10 to the conveyor frame (not shown). The frame plate 30 includes slots 31, 32 and protrusions 33, 34 for mounting a belt-guiding assembly, shown as nosebar assembly 70, for guiding the conveyor belt 20 at this transition point. The opposite frame plate 40 includes similar mounting structure, though the invention is not limited to the illustrative mounting structure.

Figure 2:
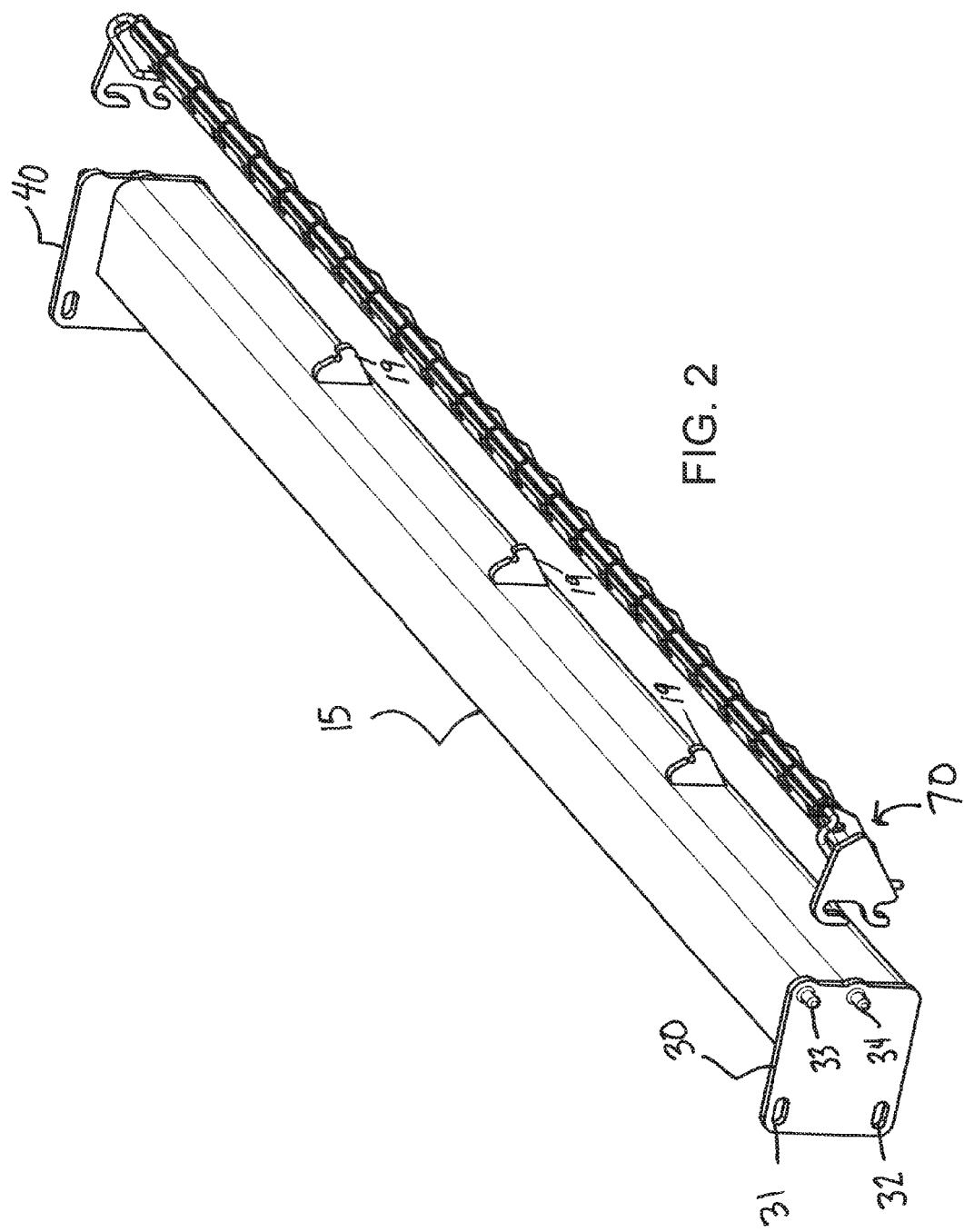
FIG. 2 is an exploded view of the infeed assembly of FIG. 1 without the conveyor belt.

FIG. 2 is an exploded view of the infeed portion 10 with the conveyor belt 20 removed. The infeed portion includes a guide plate 15 forming an end of the carryway, which curves down along the front edges of the frame plates. Brackets 19 extend from the front side of the guide plate to support the nosebar assembly 70.

Referring to FIGS. 3-6, the nosebar assembly 70 comprises one or more passive rotatable nosebars 72 for guiding the conveyor belt. In the illustrative embodiment, the nosebar assembly comprises a series of nosebars 72 mounted on an axle 74 or other structure. The nosebar assembly 70 includes mounting plates 50, 60 for mounting the nosebar assembly 70 to the conveyor frame plates 30, 40. The mounting plates 50, 60 include slots 51, 52, 61, 62 for allowing the mounting plates to be mounted on the frame plates 30, 40, by engaging the protrusions 33, 34, though any suitable means for mounting the mounting plates 50, 60 to the frame plates 30, 40 may be used. Each upper slot 51, 61 is formed in the rear edge of the respective plate 50 or 60, extends in and up towards the top of the plate. Each lower slot 52, 62 extends up from a lower edges of the respective plate.

A nosebar axle 74 extends between and is supported by the mounting plates 50, 60. The nosebar axle 74 includes a straight body portion and one or more end curves 76 to allow the nosebar axle 74 to lock into place, or rotate to allow for easy disassembly and replacement of the nosebars 72. The nosebar axle 74 ensures that all nosebars 72 are coaxial and allow free rotation of the nosebars 72 about the axle, driven by the conveyor belt 20.

When the axle 74 and the end assembly are connected, the axle 74 is locked. When removed from the conveyor, the shaft 74 can be rotated and removed. As it is removed, each individual nosebar 72 can come out.

The nosebar 72, an embodiment of which is described in US Patent Application Publication No. 2014/00116856 entitled "Positively-Driven, Low Tension Transfer Conveyor", the contents of which are herein incorporated by reference, forms a guide structure for guiding the conveyor belt around the infeed end. The nosebar 72 is mounted on and is freely rotatable about the nosebar axle 74. Roller bearings or other devices may facilitate rotation of the nosebar 72 about the nosebar axle 74. The nosebar 72 has a relatively small diameter, which may be smaller than the arc of the natural curvature of the belt 10. The small radius of the nosebar allows a smaller gap between two conveyor belts or between the conveyor belt and another device to ensure a smooth transition. The nosebars 72 have a grooved profile, shown as teeth 78 that engage drive structure on the conveyor belt 10 to allow the conveyor belt 10 to drive the nosebars 72. The nosebars function as slide bearings and the use of a series of segments across the width of the axle 74 limits deflection of the axle 74 and conveyor belt 20.

Figure 5:
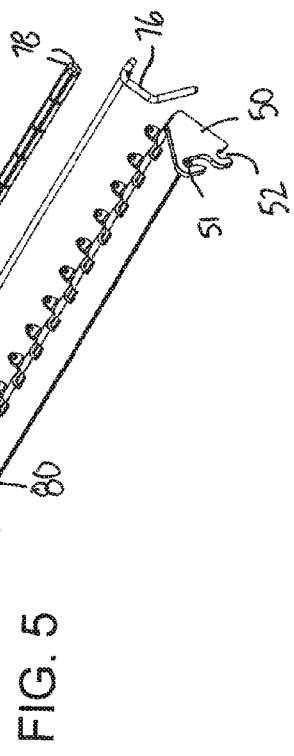
FIG. 5 is an exploded view of the nosebar assembly of FIG. 3.

The nosebar assembly 70 further includes a support beam 80 extending between the mounting plates 50, 60 providing structural support for the nosebar assembly 70. The illustrative support beam 80 includes arms 81, brackets and-or other supports that extend from the support beam 80 between each nosebar 72 in the series of nosebars to ensure proper spacing of the nosebars when a series of nosebars is employed. Alternatively, or in addition, the arms 81 provide intermediate support for the nosebars 72. As shown in FIG. 5, the arms 81 may include openings 82 through which the axle 74 passes. The arms space the nosebars along the axle.

Figure 6:
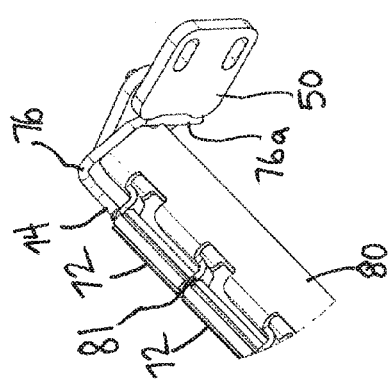
FIG. 6 is a detailed view of a portion of the infeed assembly of FIG. 1, showing the interface between the nosebar assembly and mounting plate.
Figure 7:
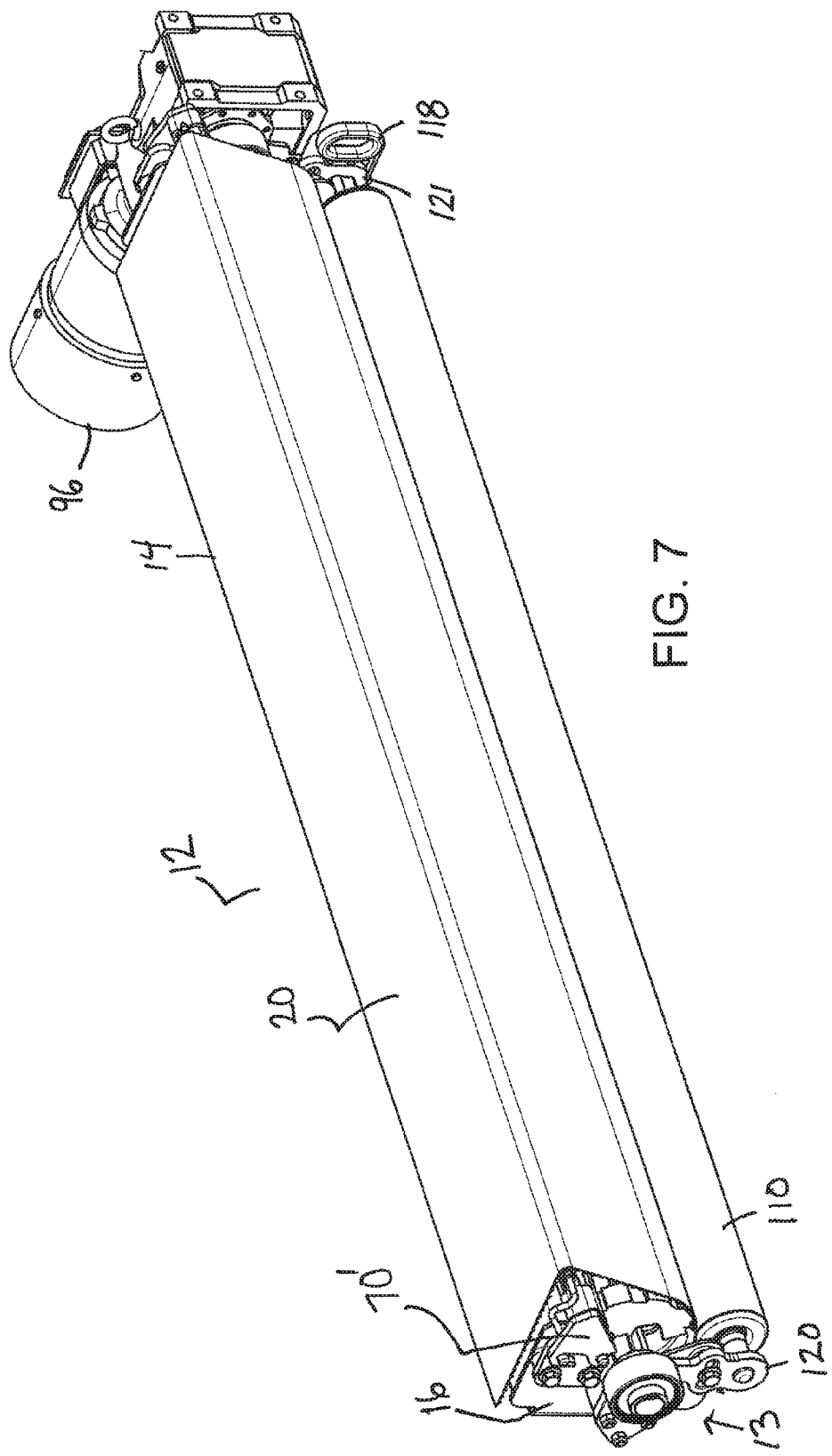
FIG. 7 is an isometric view of an outfeed end of a conveyor according to an embodiment of the invention.
Figure 8:
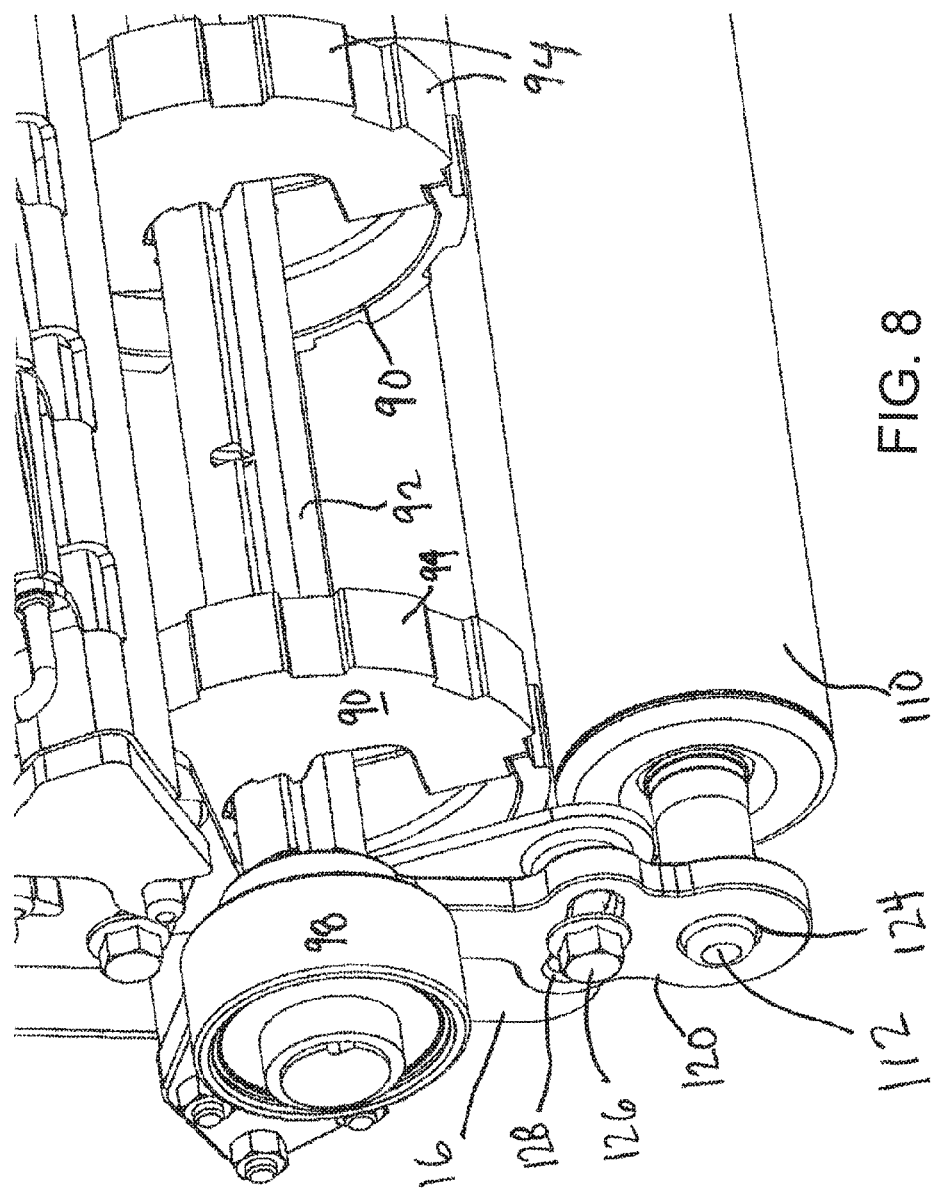
FIG. 8 is a detailed close up view of the portion of the outfeed end of FIG. 7 with the conveyor belt removed.
Figure 9:
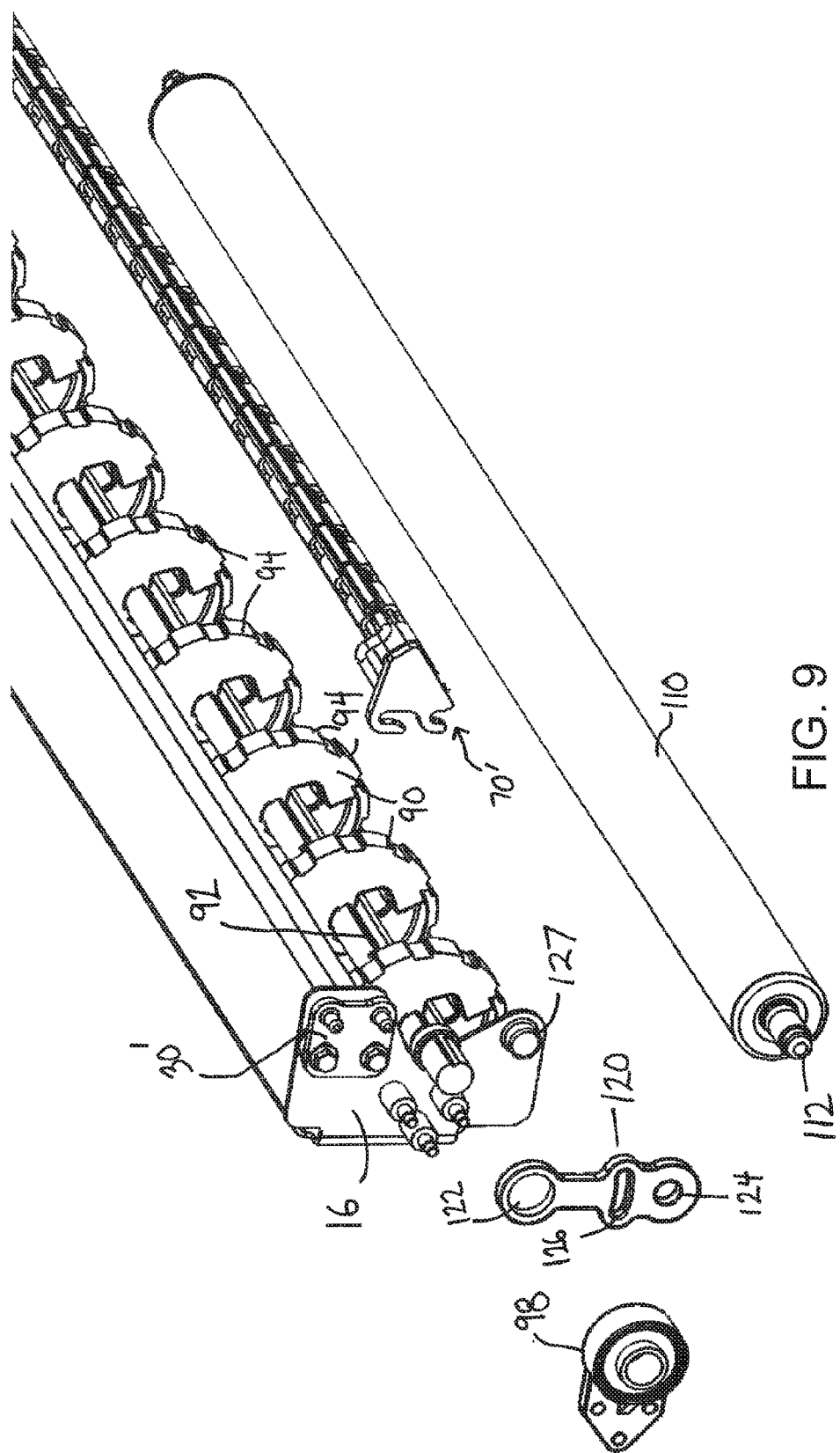
FIG. 9 is an exploded view of a portion of the outfeed end of FIG. 8 with the conveyor belt removed.
Figure 10:
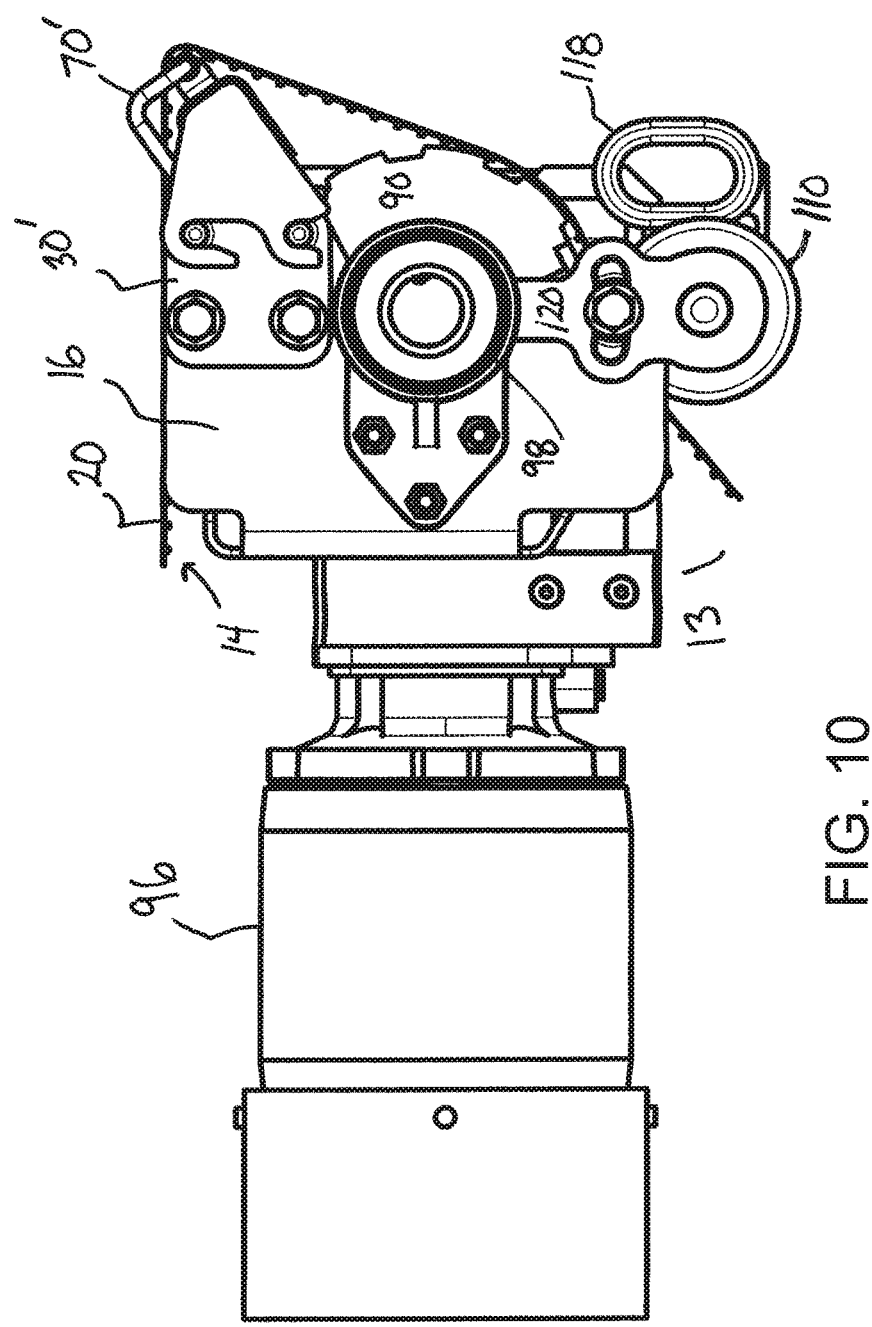
FIG. 10 is a side view of the outfeed end of FIG. 7 from a non-motor side of the assembly.

The curved end 76 of the axle 74 can lock into place in a space between the support 80, frame plate 30 and mounting plate 50 when the mounting plates 50, 60 are mounted to the frame plates 30, 40, as shown in FIG. 6. The illustrative tip 76a of the curved end extends along the front of the mounting plate 50.

The nosebar assembly 70 is preferably constructed of laser-cut and formed stainless steel parts.

The nosebar assembly 70 may be easily removed from the frame plates to allow cleaning or replacement. While assembled, the nosebar assembly facilitates the transition of conveyed items onto the conveyor belt 10. The nosebar assembly 70, which may also be used at the outfeed end, as described below, functions as a slide bearing on a small shaft, periodically supported to offer long life. The illustrative nosebar assembly 70 can be replaced or accessed without tools and without removing the conveyor belt. The axle 74 can be rotated up and slid out, allowing a nosebar 72 or a plurality of the nosebars to be easily replaced.

A tension amplifier may be used to conform the conveyor belt to the nosebar assembly, if required, as described in US Patent Application Publication No. 2014/00116856.

Referring to FIGS. 7-18, an outfeed end 12 of the conveyor smoothly transitions conveyed items off of the conveyor belt (not shown). The outfeed portion is mounted to a conveyor frame 16 includes outfeed nosebar assembly 70' disposed at the end of the carryway to transition the conveyor belt from the carryway to the sprocket assembly therebelow. The frame 16 includes two side mounting plates connected by a lateral plate. A drive for the conveyor belt 20 is disposed below the outfeed nose assembly. In the illustrative embodiment, the drive comprises one or a series of drive sprockets 90 mounted to a drive shaft 92 for driving the conveyor belt 20. The sprockets 90 include teeth 94 or other drive structure for engaging teeth or other drive structure on the conveyor belt. A motor 96 connected to the drive shaft 92 rotates the drive shaft to move the conveyor belt. Other suitable drive may be used.

The illustrative conveyor frame 16 includes side mounting plates, comprising opposing side plates including a top plate 30' for mounting a nosebar assembly, a middle slot or receptacle for receiving a drive shaft 92 and a bottom opening 127 for securing a position limiter, such as a roller limiter, as described below.

The illustrative sprockets 90 comprise split sprockets comprising two mating halves that engage the drive shaft 92. The drive sprockets may employ a snap-clamp that mates with a channel on the drive shaft 92 to assemble the drive sprocket on the drive shaft. Examples of such snap-clamps and sprockets are described in U.S. patent application Ser. No. 14/602,741, entitled "Cleanable Conveyor Frame Assembly Including Snap-On Components, filed Jan. 22, 2015 and U.S. patent application Ser. No. 14/602,455 entitled "Snap-On Position Limiter for a Conveyor Belt" filed Jan. 22, 2015, now U.S. Pat. No. 9,296,565. The contents of both applications are herein incorporated by reference.

The drive sprocket 90 can be full width or a series of individually spaced sprockets, and the invention is not limited to the illustrative design.

A bearing 98 mounted to the end of the drive shaft 92 opposite the motor 96 facilitates rotation of the drive shaft 92 and is mounted to the frame 16 via mating protrusions in the frame and openings in the bearing. Another bearing may receive the opposite end of the drive shaft 92 near the motor 96.

The outfeed portion 12 further includes a position limiter to ensure proper engagement of the drive sprockets 90 and the conveyor belt 20. In the illustrative embodiment, the position limiter is a roller limiter 110 that is placed a fixed distance away from the drive sprockets 90 to ensure that the teeth of the conveyor belt engage, and stay engaged with the drive sprockets. The limiter obviates the need for pretension of the conveyor belt 20, which significantly extends the life of the conveyor belt. The use of a position limiter also obviates the need for ball or roller bearings in the infeed and-or outfeed rollers, allowing the use of a nosebar assembly 70 or 70' in the infeed and outfeed ends. The roller limiter 110 freely spins about its longitudinal axis.

The outfeed portion 12 further includes one or more limiter plates 120 to connecting the limiter 110 to the drive shaft and ensuring a proper position of the limiter relative to the drive sprocket. At a top end, the limiter plate 120 engages the drive shaft 92. In the illustrative embodiment, the top end includes an opening 122 for receiving the drive shaft 92 and allowing the limiter plate 120 to pivot about the drive shaft 92. At a bottom end, the limiter plate 120 engages the limiter 110. The illustrative bottom end includes an opening 124 forming a bushing for receiving an axle end 112 extending from the limiter 110. In a middle portion, the limiter plate 120 includes a radial slot 126 to allow radial adjustment of the limiter plate to ensure optimal belt tooth engagement of with the drive sprockets 90. A protrusion, illustrated as a bolt 128, extends through the radial slot 126 and into the frame 16 of the conveyor. The illustrative frame 16 includes an opening 127 for receiving the bolt 128. The bolt 128 may be loosened and tightened to allow adjustment of the limiter plate 120 to selectively move the limiter 110. The ability to allow radial adjustment of the limiter plate ensures that the position limiter can provide optimal belt tooth engagement with the drive sprockets.

Figure 11:
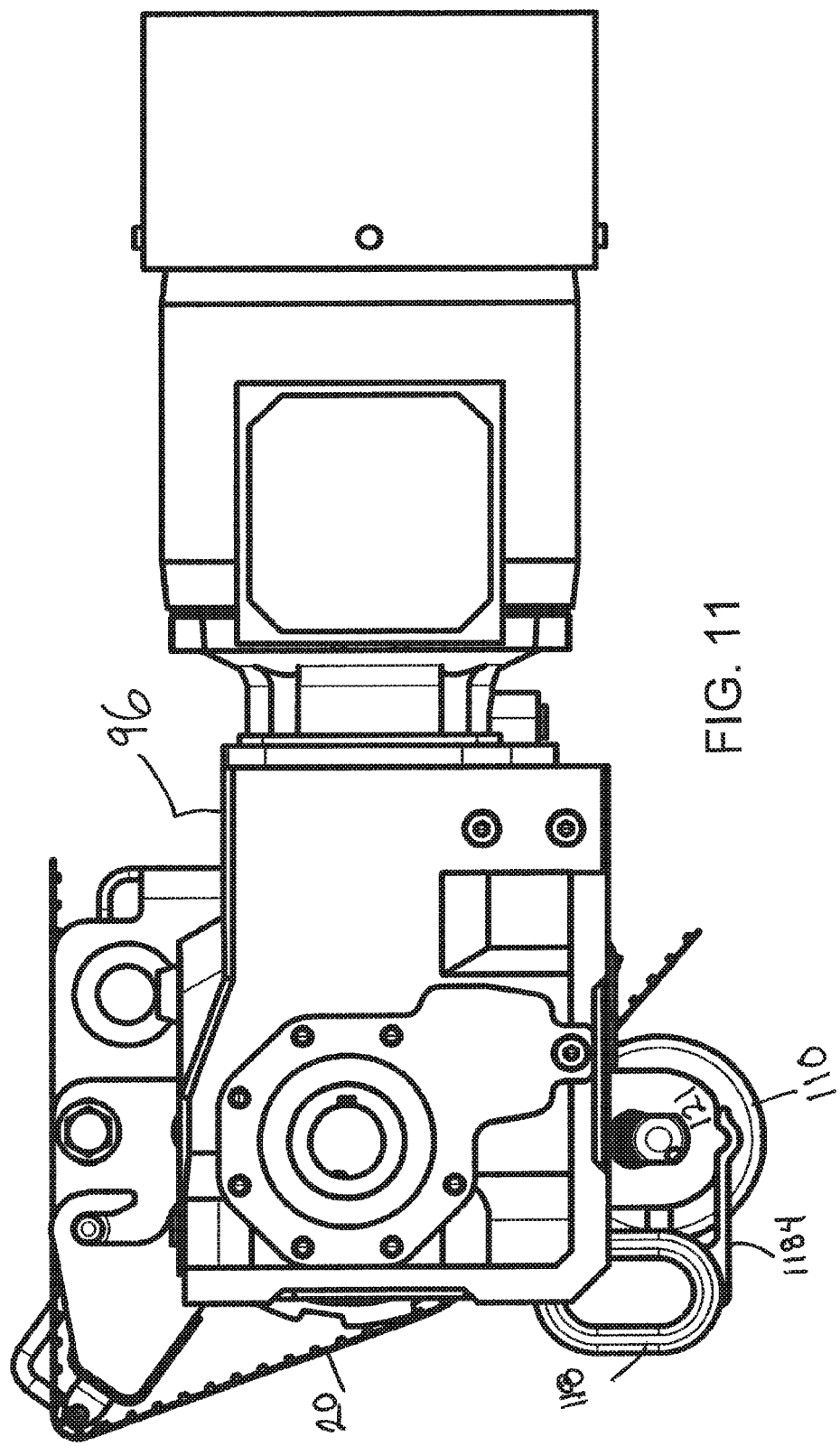
FIG. 11 is a side view of the outfeed end from a motor side.
Figure 14:
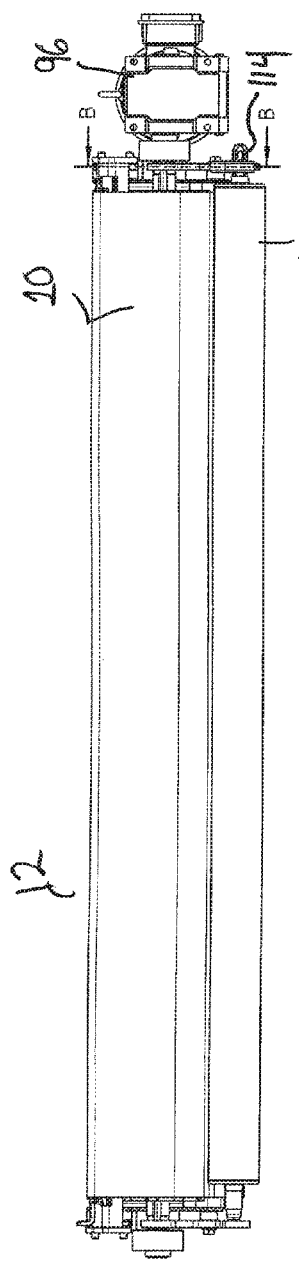
FIG. 14 is a front view of the outfeed end of FIG. 7, with a handle in a second position.
Figure 15:
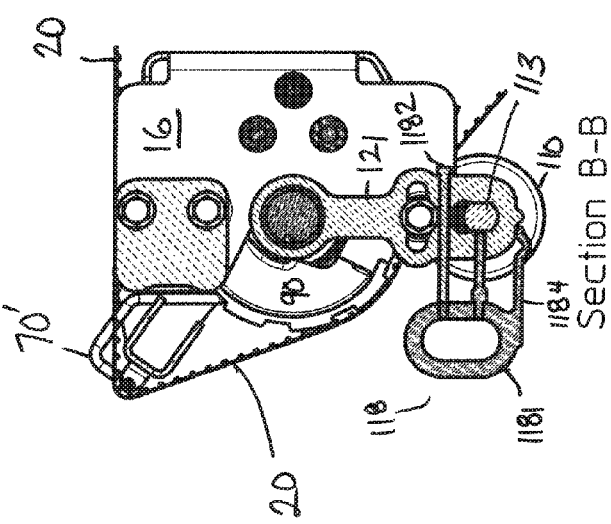
FIG. 15 is a cross-sectional view through line B-B of FIG. 14.
Figure 16:
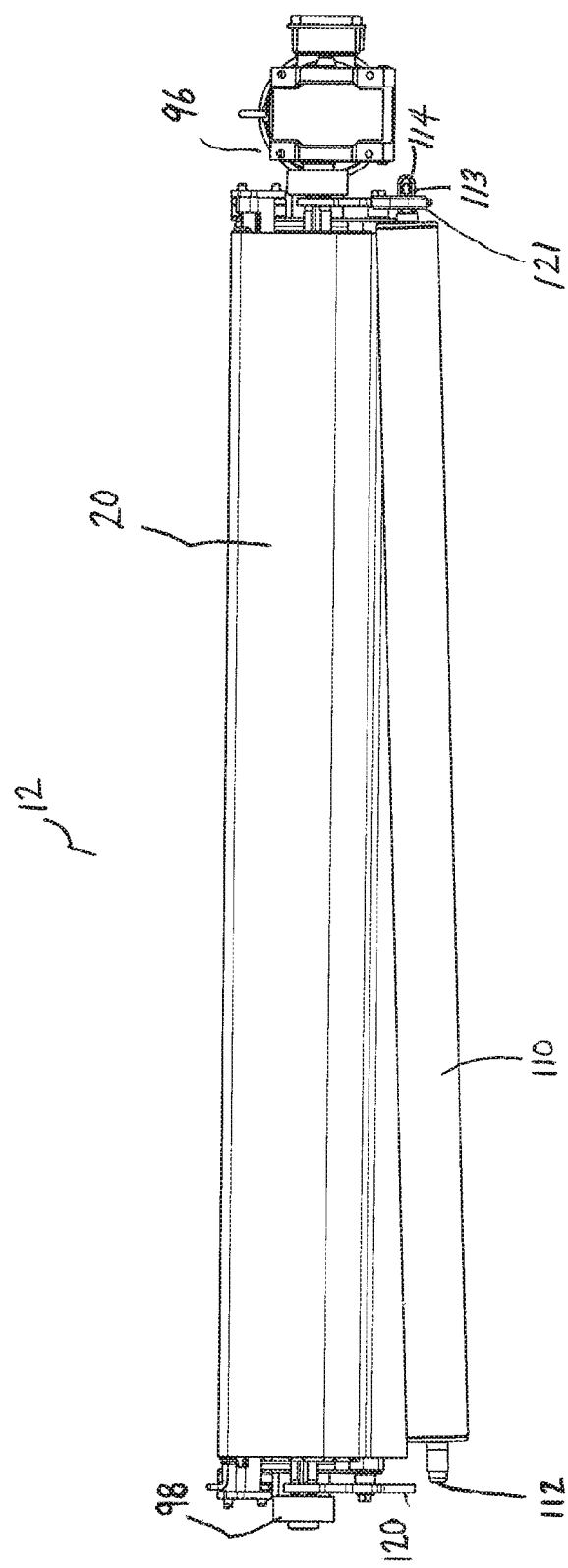
FIG. 16 is a front view of the outfeed end of FIG. 7 during removal of the roller limiter.
Figure 19:
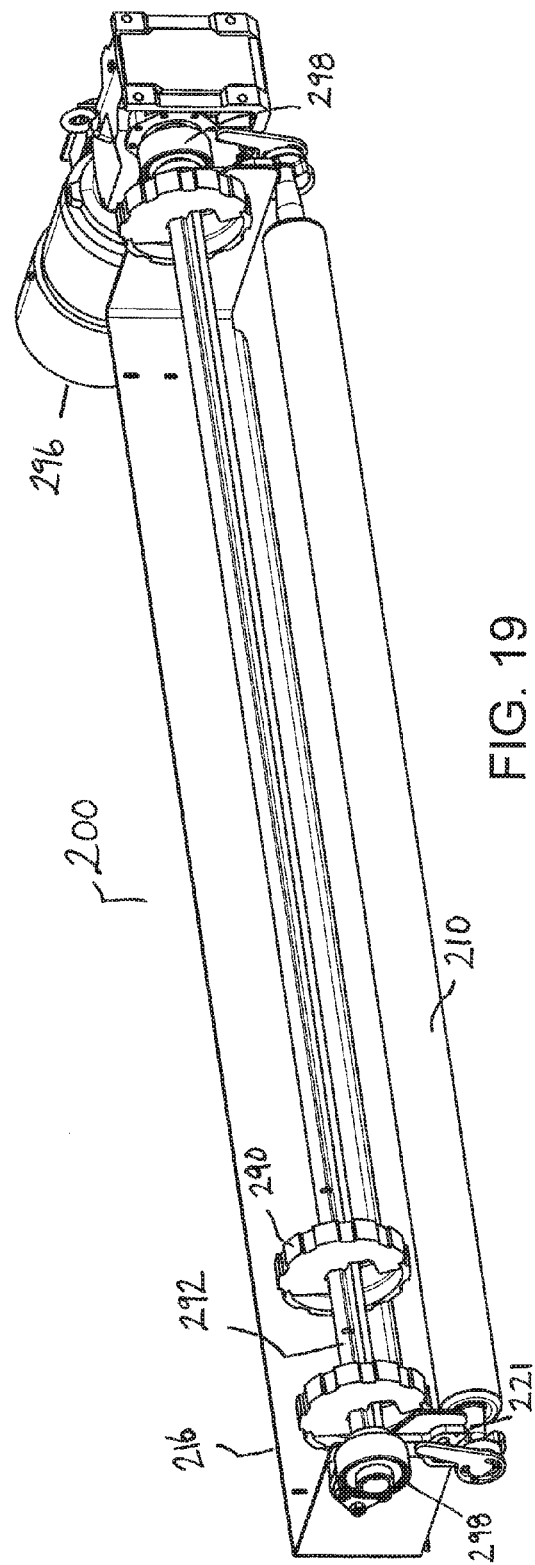
FIG. 19 is an isometric view of an outfeed assembly for a conveyor according to another embodiment of the invention.
Figure 20:
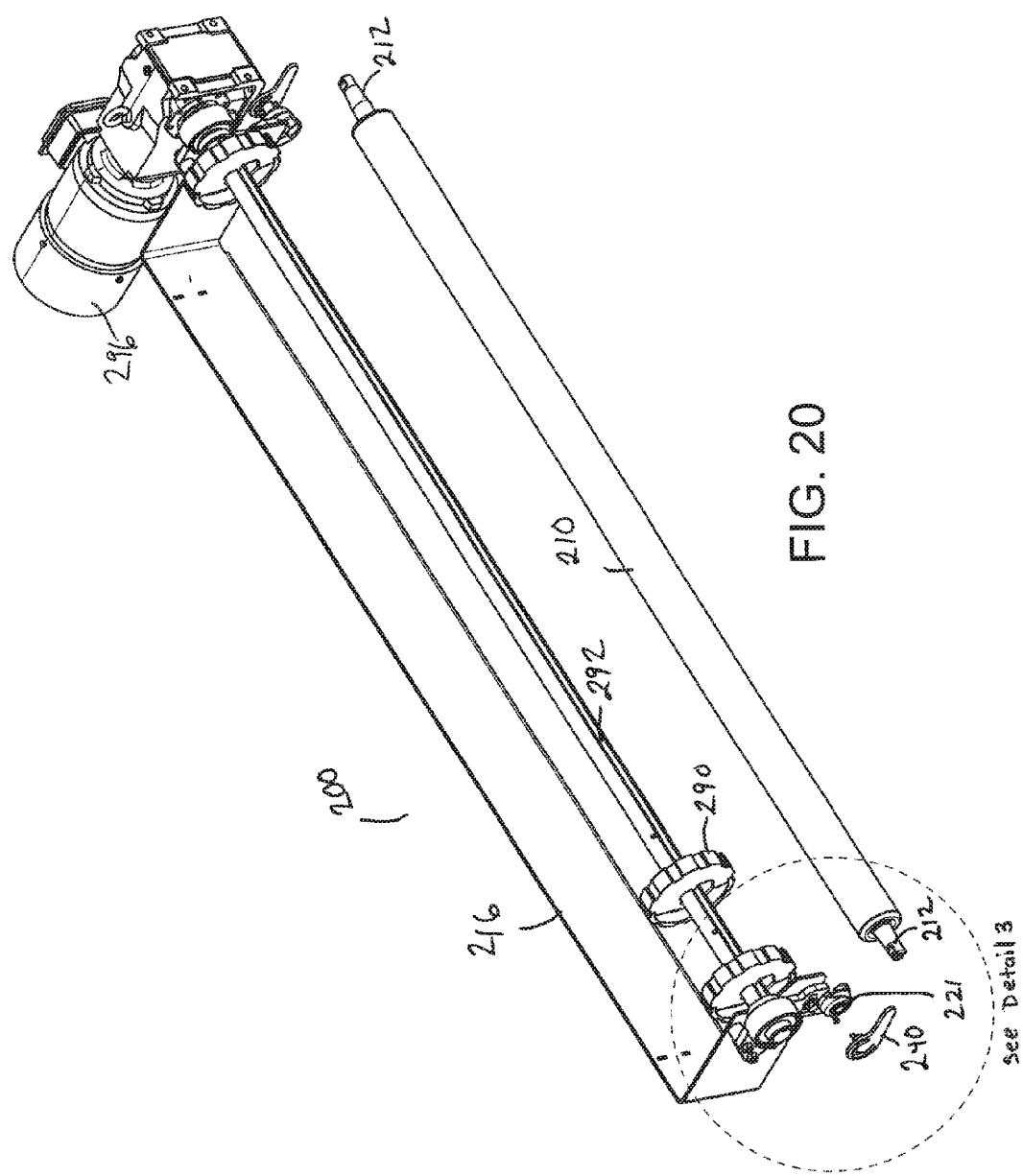
FIG. 20 is an exploded view of the outfeed assembly of FIG. 19.

Referring to FIGS. 11-16, the outfeed assembly may include a locking mechanism for selectively locking the roller limiter 110 in place. In the illustrative embodiment, a locking mechanism 118 is disposed at the motor-side of the roller limiter, though the invention is not so limited. The locking mechanism 118 allows removal of the roller limiter. As shown in FIGS. 11 and 13, the illustrative locking mechanism 118 cradles a limiter plate 121 on a motor side of the roller limiter 110 and includes a handle 1181, upper pin 1182 extending through the limiter plate 121, a middle pin 1183 and a lower pin 1184 cradling the bottom of the limiter plate. When inserted, the middle pin passes into an opening 114 through which the second axle end 113 of the roller limiter extends. As shown in FIG. 16, the middle pin 1183 passes through an opening 114 in the second axle end to secure the roller limiter 110, as shown in FIGS. 12 and 13. Pulling the locking mechanism 118, as shown in FIGS. 14 and 15, pulls the middle pin 1183 from the opening 114 and disengages the limiter plate 121 from the cradling lower pin 1184, allowing the axle nub of the roller limiter to shift, releasing the roller limiter from position. As shown in FIG. 16, the roller limiter 110 can be removed from the assembly. Pushing the locking mechanism 118 inserts the locking mechanism arms into the limiter plate 121 and locks the roller limiter 110 to the limiter plate 121, holding the roller limiter in place.

Other suitable locking mechanism for selectively locking and releasing the roller limiter 110 in place may be used. The locking mechanism enables repeatable, tool-less mounting and release of the roller limiter and ensures proper placement of the roller limiter relative to and in alignment with the drive sprockets.

Referring to FIGS. 17 and 18, the outfeed assembly allows for easy assembly, adjustment and disassembly without tools. For example, as shown in FIG. 17, when the cap forming a bearing 98 form the drive shaft 92 is removed and the bolt 128 is removed from the opening 127 in the frame 16, releasing the limiter plate 120, the roller limiter 110, still connected to the drift shaft 92 via the limiter plate, may pivot about the drift shaft to allow access or adjustment.

As shown in FIG. 18, the nosebar assembly 70' can be easily removed from the outfeed assembly for replacement or access to other components in the assembly. In another embodiment, the infeed and-or outfeed assembly forms a tension amplifier for selectively increasing tension in a limited portion of the conveyor belt. The tension amplifier employs a braking device to add tension to a select zone. For example, instead of driving the conveyor belt at the outfeed end, the drive sprocket and roller limiter may form a braking version of a tension amplifier, with the motor and driver positioned elsewhere to drive the conveyor belt in another location.

While the illustrative embodiment shows that the outfeed assembly can be adjusted independent of the drive sprockets or tension amplifier, alternatively, either the infeed assembly or outfeed assembly can be made non-adjustable.

Embodiments of the invention ensure that the roller limiter is properly placed relative to and in alignment with the drive sprockets 90, preventing unreliable performance of the conveyor belt and limiting pinching of the conveyor belt, which can crease and destroy the conveyor belt. The use of a limiter plate 120 ensures that the roller limiter 110 is always the correct distance away from the center of the shaft 92 of the sprocket 90, and it is prevented from migrating out of position. The limiter can only move radially about either the drive sprocket or tension amplifier. The locking mechanism for the limiter and limiter plate facilitates mounting and disassembly of the roller limiter.

The assembly ensures that the limiter roller is always in the correct position and correct alignment relative to the drive sprocket (or the tension amplifier, if the drive sprocket is braked), but also ensures that the infeed and outfeed nosebars are similarly aligned.

In addition, the use of a similar design for the infeed and outfeed, namely the use of an identical or similar nosebar assembly, facilitates assembly and operation.

FIGS. 19-22 show another embodiment of an outfeed assembly 200 for a conveyor that employs similar concept. The outfeed assembly 200 comprises side mounting plates connected by a lateral plate to form a frame 216. The side mounting plates include openings for mounting a drive shaft 292 carrying drive sprockets 290. A motor 296 drives the 296 drive shaft. The ends of the drive shaft 292 are held in the openings of the side mounting plates using bearings 298 mounted to the side mounting plates. A position limiter, shown as roller limiter, 210 is also mounted to the side mounting plates using limiter plates 221. Each limiter plate 221 has an upper opening for receiving the drive shaft 292 (corresponding to opening 122 above), a lower opening 224 for receiving an axle end of the position limiter 210. The limiter plate 221 includes a radial slot 226 through which a protrusion, such as a bolt 228, passes to secure the limiter plate 221 to the side mounting plates.

Figure 21:
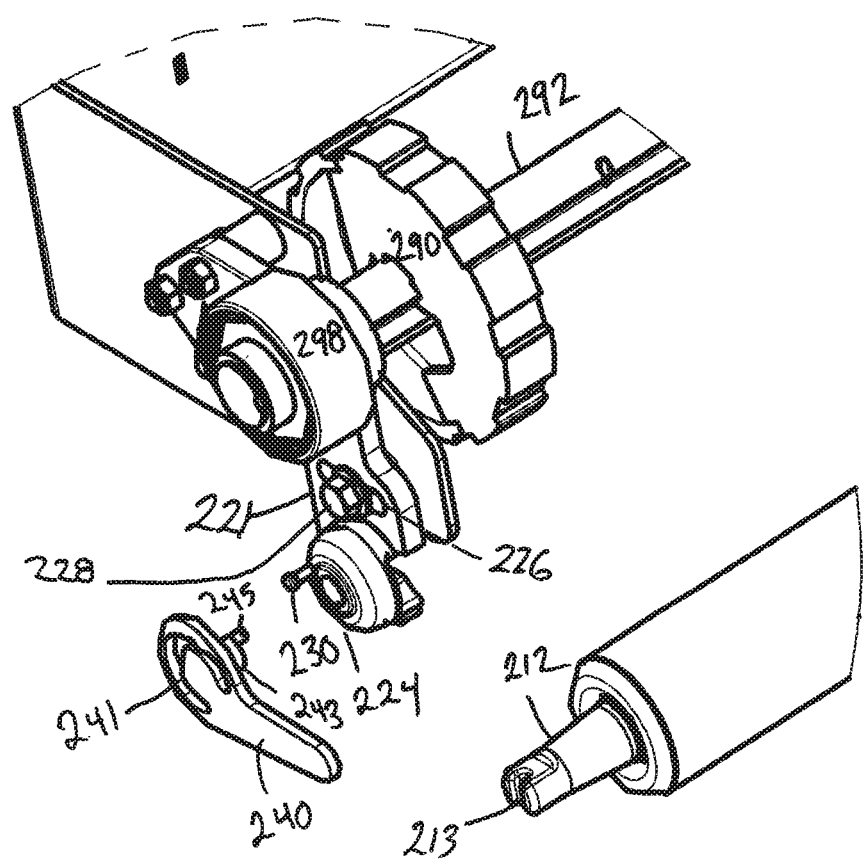
FIG. 21 is a detailed view of section 3 of FIG. 20.
Figure 22:
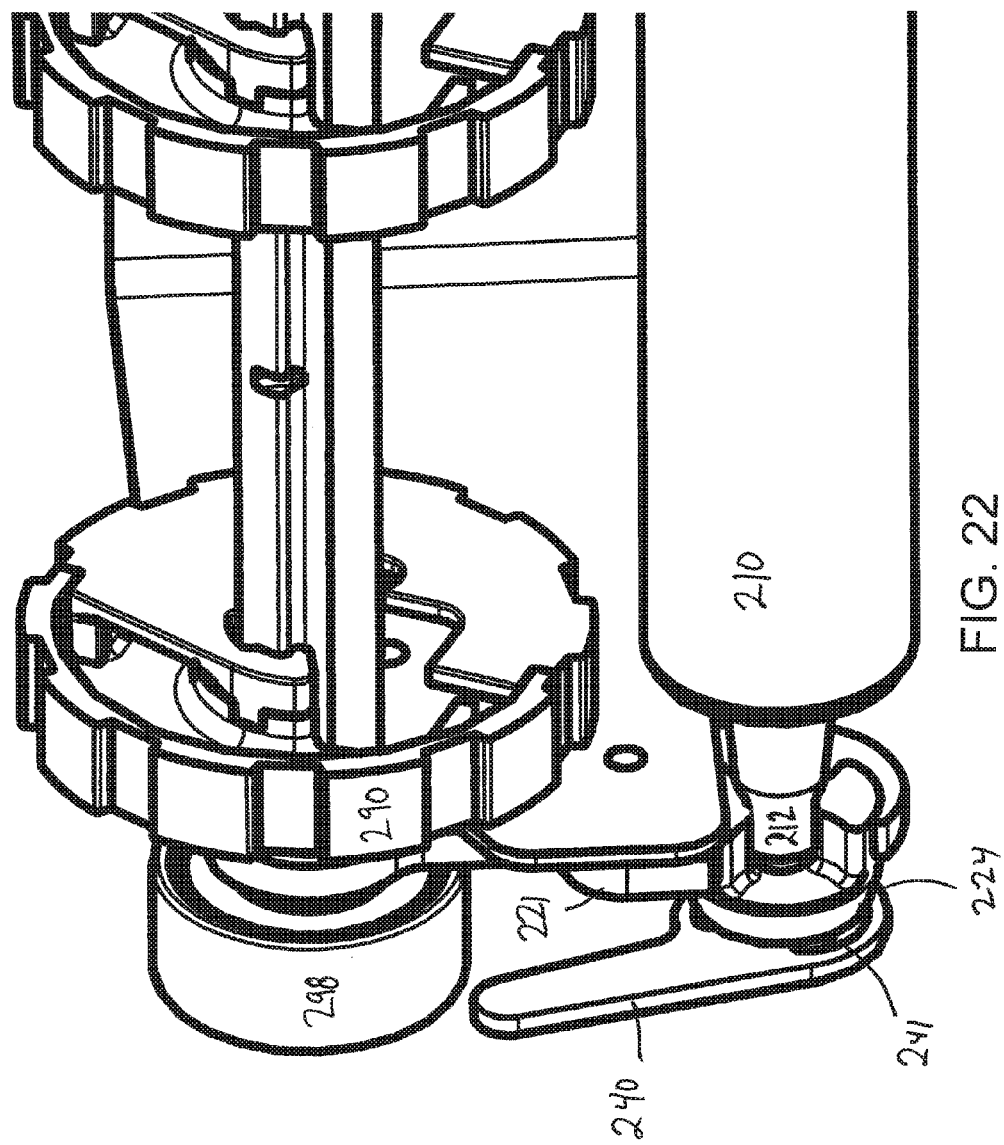
FIG. 22 is a detailed view of a portion of a portion of the outfeed assembly of FIG. 19.

The lower opening 224 comprises a receptacle for the axle ends 212 of the roller limiter. Each axle end 212 further includes a vertical slot 213 in the end face. The axle end 212 may be shaped and tapered, for example having a flat top and bottom and rounded sides. The receptacle 224 is configured to receive the axle end 212, as shown in FIG. 21. The receptacle also includes an opening facing the outer side of the side mounting plates. A protrusion 230 extends outward from the receptacle.

The assembly 200 further includes a handle 240 for selectively adjusting the position limiter 210. The handle 240 includes a base portion including a curved channel 241 and a handle portion 242. On an inside surface, the handle 240 includes a boss 243 extending inwards that is concentric with the curved channel. An eccentric pin 245 extends from the boss. When assembled, the boss 243 of the handle is inserted in into the opening 226 so that the eccentric pin 245 is inserted in the slot 213 of the position limiter and the protrusion 230 passes into the curved channel 241. When the handle is rotated, the boss spins in the opening, moving the eccentric pin forward, which pushes the position limiter forward. Protrusion in channel guides.

Figure 23:
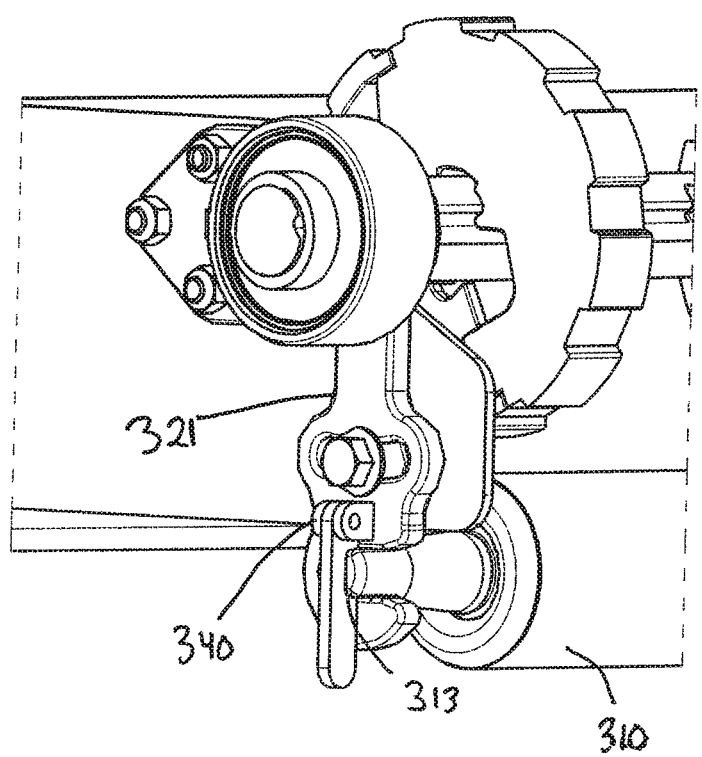
FIG. 23 shows a portion of an outfeed assembly including a handle of another embodiment of the invention.

In another embodiment, shown in FIG. 23, a handle 340 for selectively locking a position limiter 310 relative to a limiter plate 321 may comprise a pivotable handle that selectively engages a slot 313 in the end face of the position limiter. Other suitable means for selectively retaining a position limiter in place may be used, and the invention is not limited to the illustrative handles.

The scope of the claims is not meant to be limited to the details of the described exemplary embodiments.

What is claimed is:

1. A conveyor, comprising:
   a frame including opposing side plates at an end of the conveyor, each side plate including at least one outward-facing protrusion; and
   a removable belt-guiding assembly mounted to the opposing side plates, the belt-guiding assembly comprising a support beam extending from a first side to a second side, arms extending from the support beam, an axle having a curved end and supported by the arms, and a rotatable nosebar mounted on the axle, wherein the removable belt-guiding assembly is mounted to the frame using the outward-facing protrusion.

2. The conveyor of claim 1, wherein the removable belt-guiding assembly comprises a first mounting plate connected to the first side of the support beam and second mounting plate connected to the second side of the support beam, each mounting plate including a slot for engaging the outward facing protrusions to integrate the belt-guiding assembly into the conveyor.

3. The conveyor of claim 2, wherein the curved end extends between a front edge of one of the side plates and the first mounting plate when the belt-guiding assembly is mounted to the opposing side plates.

4. The conveyor of claim 1, wherein the rotatable nosebar comprises a plurality of toothed, rotatable nosebar segments arranged in series on the axle.

5. The conveyor of claim 4, wherein the arms extend between the nosebar segments and each arm includes an opening for receiving the axle.

6. The conveyor of claim 4, further comprising an opening each of the side plates below the protrusions for receiving a drive shaft having at least one drive sprocket mounted thereon for driving a conveyor belt.

7. The conveyor of claim 6, further comprising a roller position limiter mounted a fixed distance away from the drive shaft to ensure engagement of the conveyor belt with the drive sprocket.

8. The conveyor of claim 7, further comprising a limiter plate connecting the drive shaft with the roller position limiter.

9. The conveyor of claim 8, wherein the limiter plate includes an upper opening for receiving the drive shaft, a lower opening for receiving an axle end of the roller position limiter and a radial slot between the upper opening and the lower opening for receiving a protrusion to selectively secure the limiter plate to a side plate.

10. The conveyor of claim 9, further comprising a handle for selectively releasing the axle end from the lower opening.

11. The conveyor of claim 10, wherein the handle comprises a pin that extends through an opening in the axle end, whereby retraction of the pin releases the axle end.

12. A belt-guiding assembly for guiding a conveyor belt around an end of a conveyor frame, comprising:
    a support beam extending from a first side to a second side;
    a plurality of arms extending from the support beam, each arm including an opening;
    an axle passing through the openings, the axle having a curved end;

a plurality of rotatable nosebar segments inserted in spaces between the arms and mounted on the axle.

13. The belt-guiding assembly of claim 12, further comprising:
a first mounting plate including at least one slot;
a second mounting plate opposing the first mounting plate and including at least one slot, wherein the support beam extends between the first mounting plate and the second mounting plate.

14. The belt-guiding assembly of claim 13, wherein the first mounting plate includes an upper slot and a lower slot for engaging first and second protrusions on the conveyor frame.

15. The belt-guiding assembly of claim 12, wherein the nosebar segments each include a plurality of peripheral teeth for engaging a conveyor belt.

16. A conveyor, comprising:
a frame;
a positive-drive, low tension conveyor belt trained around an infeed portion and an outfeed portion, the outfeed portion comprising:
a belt-guiding assembly comprising a rotatable nosebar for guiding the conveyor belt from a carryway to a returnway;
a drive mounted on a drive shaft below the belt-guiding assembly;
a roller limiter mounted a fixed distance away from the drive to ensure engagement of the conveyor belt with the drive; and
a limiter plate for connecting the roller limiter to the drive, the limiter plate comprising an upper opening for receiving the drive shaft, a lower opening for receiving an axle end of the roller limiter and a radial slot between the upper opening and the lower opening that engages a protrusion in the frame to allow radial adjustment of the roller limiter.

17. The conveyor of claim 16, further comprising a handle for selectively securing the limiter plate to the roller limiter.

18. The conveyor of claim 17, wherein the handle includes an eccentric pin and the axle end of the roller limiter includes a vertical slot that receives the eccentric pin.

19. The conveyor of claim 17, wherein the handle includes a first pin that passes through the limiter plate and a second pin that engages an opening in roller limiter.

20. The conveyor of claim 19, wherein the handle includes a third pin that cradles the bottom of the limiter plate.

* * * * *

UNITED STATES PATENT AND TRADEMARK OFFICE
CERTIFICATE OF CORRECTION

PATENT NO. : 9,751,695 B2
APPLICATION NO. : 15/134678
DATED : September 5, 2017
INVENTOR(S) : Michael Hendrik DeGroot et al.

Page 1 of 1

It is certified that error appears in the above-identified patent and that said Letters Patent is hereby corrected as shown below:

On the Title Page

Item (72) Inventors lines:
Add -- James R. Honeycutt, Jr., MI (US) --.

Signed and Sealed this
Thirteenth Day of November, 2018

Andrei Iancu
*Director of the United States Patent and Trademark Office*